(No Model.)
E. P. FOX.
TRANSPLANTER.
No. 578,398.  Patented Mar. 9, 1897.
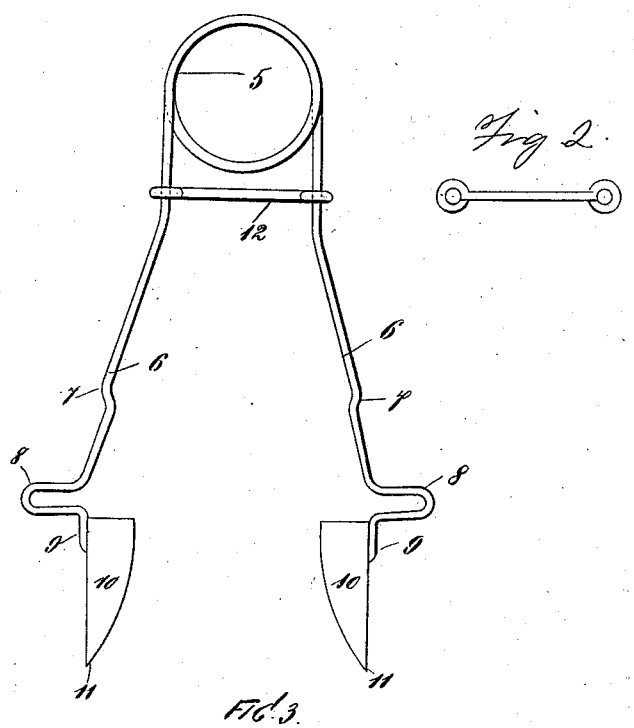
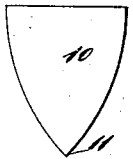
WITNESSES
INVENTOR
Edward P. Fox.
BY
Edgar Tate & Co.
ATTORNEYS

UNITED STATES PATENT OFFICE.

EDWARD PATRICK FOX, OF PATERSON, NEW JERSEY.

TRANSPLANTER.

SPECIFICATION forming part of Letters Patent No. 578,398, dated March 9, 1897.

Application filed July 2, 1896. Serial No. 597,848. (No model.)

*To all whom it may concern:*

Be it known that I, EDWARD PATRICK FOX, a citizen of the United States, and a resident of Paterson, in the county of Passaic and State of New Jersey, have invented certain new and useful Improvements in Transplanters, of which the following is a specification, reference being had to the accompanying drawings, forming a part thereof, in which similar numerals of reference indicate corresponding parts.

This invention relates to transplanting devices for use in transplanting plants and flowers and for similar purposes; and the object thereof is to provide an improved device of this class which is simple in construction and operation and also comparatively inexpensive, while being well adapted to accomplish the result for which it is intended.

The invention is fully disclosed in the following specification, of which the accompanying drawings form a part, in which—

Figure 1 is a side view of my improved transplanting device, and Figs. 2, 3, and 4 represent details of the construction.

In the practice of my invention I provide a transplanting device which is preferably composed of a piece of strong spring-wire or similar material, which is bent centrally to form a spring ring or head 5, the separate sides thereof being carried downwardly and bent outwardly below said spring ring or head to form arms 6, which are provided at a predetermined distance below said spring ring or head with outwardly-curved shoulders or projections 7, and below said shoulders or projections 7 with outwardly-curved loops 8, which may be of any desired length, and below said loops the sides or arms 6 are bent downwardly to form extensions 9, to which are secured shovels 10, the upper ends of which are segmental or semicircular in form, as shown in Fig. 4, and the sides of which are cut away gradually, so as to form points 11, and mounted on the upper portions of the arms or side pieces 6 is a sliding cross head or bar 12, provided at each end with an eye or ring 13, and said cross head or bar is adapted to be moved downwardly, so as to contract or draw together the arms or sides 6, and the operation will be readily understood from the foregoing description when taken in connection with the accompanying drawings and the following statement thereof. The shape of the shovels or scoops 10 is clearly shown in Figs. 1, 3, and 4, Fig. 1 showing a side view of the same and Fig. 2 a back view, while Fig. 4, as hereinbefore stated, is an end view thereof; and in practice these scoops or shovels are forced into the ground on each side of the flower or plant to be removed or transplanted and the device is turned around, so as to cut out a circular portion of the soil around said flower or plant, which is afterward removed or lifted out, as will be readily understood, and in replanting or replacing the flower or plant a similar hole is formed, into which the flower or plant is again inserted.

The outwardly-directed loops 8 are designed to prevent the scoops or shovels 10 from being forced too far into the ground, and it will be understood that by adjusting the position of the cross head or bar 12 the size of the portion of soil cut out may be regulated as desired.

This device is simple in construction and operation and also comparatively inexpensive, while being well adapted to accomplish the result for which it is intended, and it is evident that changes in and modifications of the construction herein described may be made without departing from the spirit of my invention or sacrificing its advantages.

Having fully described my invention, I claim as new and desire to secure by Letters Patent—

As a new article of manufacture a transplanting device for flowers and plants consisting of a strong metal wire having formed centrally therein a spring ring or head, the separate sides thereof being directed downwardly then outwardly, arms formed thereby, outwardly-curved shoulders or projections formed in said arms and at a predetermined distance below said head, outwardly-curved loops formed in said arms at a predetermined distance below said shoulders, extensions formed on said arms and below said loops, shovels having segmental or semicircular upper ends and cut-away sides secured to said extensions, a sliding cross head or bar mounted on the upper portions of said arms, a ring or eye secured to and integral with said crosshead at either end thereof and having passed therethrough said arms, all of the said parts being combined substantially as and for the purposes described.

In testimony that I claim the foregoing as my invention I have signed my name, in presence of the subscribing witnesses, this 25th day of June, 1896.

EDWARD PATRICK FOX.

Witnesses:
JAMES A. SCANLAN,
ROBERT D. BUCKLEY.